United States Patent
Kim et al.

(10) Patent No.: US 10,656,023 B2
(45) Date of Patent: May 19, 2020

(54) TEMPERATURE SENSING DEVICE AND TEMPERATURE-VOLTAGE CONVERTER

(71) Applicant: SAMSUNG ELECTRONICS CO., LTD., Suwon-Si, Gyeonggi-Do (KR)

(72) Inventors: Jooseong Kim, Seoul (KR); Kwangho Kim, Yongin-Si (KR); Sangho Kim, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/199,097

(22) Filed: Nov. 23, 2018

(65) Prior Publication Data
US 2019/0226922 A1  Jul. 25, 2019

(30) Foreign Application Priority Data
Jan. 24, 2018 (KR) .................. 10-2018-0008820

(51) Int. Cl.
*G01K 7/01* (2006.01)
*G01K 7/16* (2006.01)

(52) U.S. Cl.
CPC .............. *G01K 7/01* (2013.01); *G01K 7/16* (2013.01); *G01K 2219/00* (2013.01)

(58) Field of Classification Search
CPC ......... G01K 7/01; G01K 7/16; G01K 2219/00
See application file for complete search history.

(56) References Cited

U.S. PATENT DOCUMENTS

| | | | |
|---|---|---|---|
| 6,683,489 B1 | 1/2004 | Eker | |
| 6,844,772 B2 | 1/2005 | Hoon et al. | |
| 6,847,319 B1 * | 1/2005 | Stockstad | G01K 7/01 341/119 |
| 7,611,279 B2 * | 11/2009 | Vogt | G01K 1/02 374/100 |
| 8,373,444 B2 | 2/2013 | Lee et al. | |
| 8,878,511 B2 | 11/2014 | Iacob et al. | |
| 9,671,294 B2 | 6/2017 | Pan | |
| 9,915,569 B2 * | 3/2018 | Cho | G01K 7/18 |
| 10,473,531 B2 * | 11/2019 | Yen | G01K 7/01 |
| 2009/0051341 A1 | 2/2009 | Chang et al. | |

OTHER PUBLICATIONS

Chang, Ming-Hui et al., "Chip Implementation with a Combined Wireless Temperature Sensor and Reference Devices Based on the DZTC Principle," ISSN 1424-8220, Sensors 2011, 11, 10308-10325.

Agnes, A. et al., "A 9.4-ENOB 1V 3.8uW 100kSis SAR ADC with Time-Domain Comparator," IEEE Int. Solid-State Circuits Conf.—Digest of Technical Papers, ISSCC 2008, San Francisco, Feb. 3-7, 2008, pp. 246-247.

* cited by examiner

*Primary Examiner* — Patrick O Neill
(74) *Attorney, Agent, or Firm* — Volentine, Whitt & Francos, PLLC

(57) ABSTRACT

A temperature sensing device includes a temperature-voltage converter that outputs a first voltage, having a zero temperature coefficient that does not vary with a temperature, and a second voltage having a negative temperature coefficient varying in inverse proportion to the temperature. A multiplexer alternately outputs the first voltage and the second voltage depending on a transition signal. A temperature sensor alternately receives the first voltage and the second voltage and senses the temperature depending on a ratio of the first voltage and the second voltage.

20 Claims, 14 Drawing Sheets

TEMPERATURE SENSING DEVICE AND TEMPERATURE-VOLTAGE CONVERTER

CROSS-REFERENCE TO RELATED APPLICATIONS

This application claims priority under 35 U.S.C. § 119 to Korean Patent Application No. 10-2018-0008820 filed on Jan. 24, 2018, in the Korean Intellectual Property Office, the disclosure of which is incorporated by reference herein in its entirety.

BACKGROUND

Embodiments of the disclosure described herein relate to an electronic device, and more particularly, relate to a temperature sensing device.

The degree of integration of semiconductor devices is being improved as semiconductor manufacturing technologies develop. As semiconductor devices are integrated, the heat generated during an operation of the semiconductor devices may make the performance of the semiconductor devices reduced or the semiconductor devices broken down.

To prevent the heat, a way to sense the heat of semiconductor devices and adjust the availability ratio of the semiconductor devices is being developed. A temperature sensing device that senses a temperature is required to sense the heat of the semiconductor devices. The temperature sensing device may be implemented by using various devices. For example, the temperature sensing device may be implemented by using transistors in that operating characteristics of transistors vary with a temperature.

A power supply voltage for the semiconductor devices is decreasing as the semiconductor devices are miniaturized and integrated and a low-power design is required. A conventional temperature sensing device is not suitable for low power. Accordingly, the conventional temperature sensing device is suitable for a system that uses a high power supply voltage or for a system that additionally uses a high power supply voltage for the temperature sensing device while using a low power supply voltage.

SUMMARY

Embodiments of the disclosure provide a temperature sensing device that senses a temperature by using a low power supply voltage in a system that uses the low power supply voltage.

According to an exemplary embodiment, a temperature sensing device includes a temperature-voltage converter that outputs a first voltage, having a zero temperature coefficient that does not vary with a temperature, and a second voltage having a negative temperature coefficient varying in inverse proportion to the temperature. A multiplexer alternately outputs the first voltage and the second voltage depending on a transition signal. A temperature sensor alternately receives the first voltage and the second voltage and senses the temperature depending on a ratio of the first voltage and the second voltage.

According to an exemplary embodiment, a temperature-voltage converter includes: (1) a resistor that receives a first current having a first current amount and generates a reference voltage by using the first current, (2) a transistor that receives a second current having the first current amount and generates a first voltage by using the second current, (3) an amplifier that compares the first voltage and the reference voltage and outputs a control voltage for adjusting the first current amount and the second current amount depending on a result of the comparison, (4) a voltage follower transistor that receives a third current having the second current amount, drains a fifth current having the first current amount from the third current, and generates the first voltage by using the fifth current, (5) a first voltage transistor and a fourth voltage transistor that receive a fourth current having the first current amount, and (6) a second voltage transistor and a third voltage transistor that receive a sixth current obtained by subtracting the fifth current from the third current. The first voltage transistor mirrors the first current amount of the fourth current to the second voltage transistor. The third voltage transistor mirrors the first voltage of the voltage follower transistor to the fourth voltage transistor. The first voltage is output as a zero temperature coefficient voltage and a voltage of a gate of the first voltage transistor is output as a negative temperature coefficient voltage.

According to an exemplary embodiment, a temperature sensing device includes a temperature-voltage converter that outputs a first voltage having a zero temperature coefficient, which does not vary with a temperature, and a second voltage having a negative temperature coefficient varying in inverse proportion to the temperature. A voltage-time converter converts the first voltage and the second voltage to first time information and second time information, respectively. A time-digital converter converts the first time information and the second time information to first digital time information and second digital time information, respectively. A digital processor calculates the temperature depending on a ratio of the first digital time information and the second digital time information.

According to an exemplary embodiment, a temperature sensing device includes a temperature-voltage converter and a temperature sensor. The temperature-voltage converter generates a first voltage, having a first temperature coefficient that does not vary with a temperature of the temperature-voltage converter, and a second voltage having a second temperature coefficient that varies in proportion to the temperature of the temperature-voltage converter. The temperature sensor determines the temperature of the temperature-voltage converter from the first voltage and the second voltage.

BRIEF DESCRIPTION OF THE FIGURES

The above and other objects and features of the disclosure will become apparent by describing in detail exemplary embodiments thereof with reference to the accompanying drawings.

DETAILED DESCRIPTION

Below, embodiments of the disclosure may be described in detail and clearly to such an extent that an ordinary one in the art easily implements the disclosure.

Figure 1:
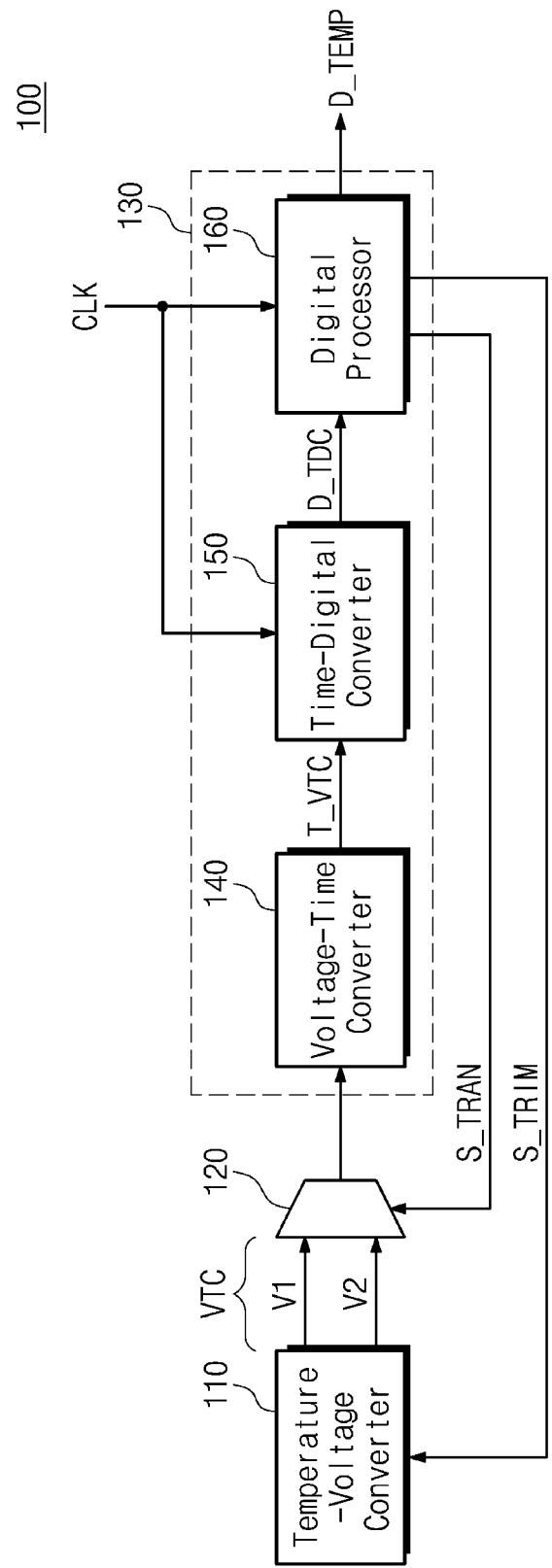
FIG. 1 is a block diagram illustrating a temperature sensing device according to an embodiment of the disclosure.

FIG. 1 is a block diagram illustrating a temperature sensing device 100 according to an embodiment of the disclosure. Referring to FIG. 1, the temperature sensing device 100 may sense an ambient temperature to output a digital temperature D_TEMP. The temperature sensing device 100 includes a temperature-voltage converter 110, a multiplexer 120, and a temperature sensor 130.

The temperature-voltage converter 110 may output a first voltage V1 and a second voltage V2. The first voltage V1 may have a zero temperature coefficient ZTC. The second voltage V2 may have a negative temperature coefficient NTC. The first voltage V1 and the second voltage V2 may be collectively referred to as a "temperature coefficient voltage VTC". A temperature coefficient is exemplified in FIG. 2.

Figure 2:
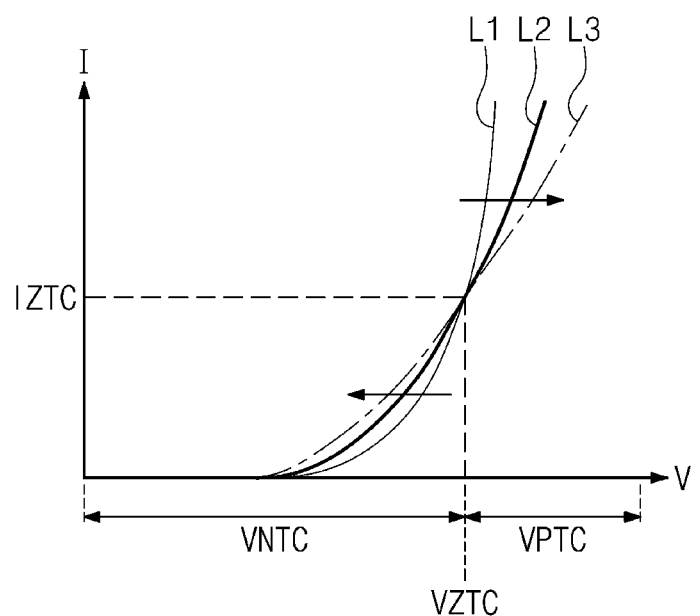
FIG. 2 illustrates an exemplification of a temperature coefficient.

FIG. 2 illustrates a relationship between a voltage "V" applied to a specific transistor and a current "I" flowing to the specific transistor as the voltage "V" is applied. In FIG. 2, a horizontal axis represents a voltage "V" of a specific transistor, and a vertical axis represents a current "I". For example, the horizontal axis represents a difference between a gate voltage and a source voltage of the specific transistor.

A first line L1 shows a relationship between the voltage "V" and the current "I" at a low temperature. A second line L2 shows a relationship between the voltage "V" and the current "I" at an intermediate temperature. A third line L3 shows a relationship between the voltage "V" and the current "I" at a high temperature. The first to third lines L1 to L3 may intersect at a point.

If the voltage "V" corresponding to the intersection point is applied to the specific transistor, the amount of current "I" flowing through the specific transistor may be maintained at a first current amount IA1 and may not vary with a temperature. Accordingly, a zero temperature coefficient voltage VZTC having a zero temperature coefficient ZTC and a zero temperature coefficient current IZTC having the zero temperature coefficient voltage ZTC may be present at the intersection point of the first to third lines L1 to L3.

In a voltage range lower than the zero temperature coefficient voltage VZTC, when a given voltage "V" is applied to the specific transistor, the current "I" (or the amount of current) flowing to the specific transistor increases as a temperature increases. Thus, in order to maintain a current amount, as marked by an arrow, the voltage "V" applied to the specific transistor has to decrease as the temperature increases. Accordingly, a voltage that is lower than the zero temperature coefficient voltage VZTC may be a negative temperature coefficient voltage VNTC having the negative temperature coefficient NTC.

In a voltage range higher than the zero temperature coefficient voltage VZTC, when the given voltage "V" is applied to the specific transistor, the current "I" (or the amount of current) that flows to the specific transistor decreases as a temperature increases. Thus, in order to maintain a current amount, as marked by an arrow, the voltage "V" applied to the specific transistor has to increase as the temperature increases. Accordingly, a voltage higher than the zero temperature coefficient voltage VZTC may be a positive temperature coefficient voltage VPTC having the positive temperature coefficient PTC.

Returning to FIG. 1, the temperature-voltage converter 110 generates the first voltage V1 and the second voltage V2 lower than the first voltage V1. If a range of output voltages (e.g., V1 and V2) of the temperature-voltage converter 110 decreases, internal components of the temperature-voltage converter 110 may be configured to operate using a lower power supply voltage.

The multiplexer 120 may receive the first voltage V1 and the second voltage V2 from the temperature-voltage converter 110. The multiplexer 120 may alternately output the first voltage V1 and the second voltage V2 in response to a transition signal S_TRAN.

For example, when the transition signal S_TRAN has a first level (e.g., a low level), the multiplexer 120 may output the first voltage V1. When the transition signal S_TRAN has a second level (e.g., a high level), the multiplexer 120 may output the second voltage V2.

The temperature sensor 130 may receive the temperature coefficient voltage VTC from the multiplexer 120 and may sense a temperature by using the temperature coefficient voltage VTC. For example, the temperature sensor 130 may alternately receive the first voltage V1 and the second voltage V2 as the temperature coefficient voltage VTC.

The temperature sensor 130 may sense a temperature depending on a ratio of the first voltage V1 and the second voltage V2. The temperature sensor 130 may output the sensed temperature as the digital temperature D_TEMP. The temperature sensor 130 includes a voltage-time converter 140, a time-digital converter 150, and a digital processor 160.

The voltage-time converter 140 may receive the temperature coefficient voltage VTC from the multiplexer 120. For example, the voltage-time converter 140 may receive one of the first voltage V1 and the second voltage V2 from the multiplexer 120. The voltage-time converter 140 may convert the temperature coefficient voltage VTC to time information T_VTC.

For example, when the multiplexer 120 outputs the first voltage V1 as the temperature coefficient voltage VTC, the voltage-time converter 140 may convert the first voltage V1 to first time information T_VTC1. When the multiplexer 120 outputs the second voltage V2 as the temperature coefficient voltage VTC, the voltage-time converter 140 may convert the second voltage V2 to second time information T_VTC2.

The time-digital converter 150 may receive a clock signal CLK and may receive the time information T_VTC from the voltage-time converter 140. The time-digital converter 150 may convert the time information T_VTC to digital time information D_TDC by using the clock signal CLK.

For example, when the multiplexer 120 outputs the first voltage V1 as the temperature coefficient voltage VTC, the time-digital converter 150 may convert the first time information T_VTC1 to first digital time information D_TDC1. When the multiplexer 120 outputs the second voltage V2 as the temperature coefficient voltage VTC, the time-digital converter 150 may convert the second time information T_VTC2 to second digital time information D_TDC2.

The digital processor 160 may receive the clock signal CLK and may receive the digital time information D_TDC from the time-digital converter 150. The digital processor 160 may calculate the digital temperature D_TEMP by using the digital time information D_TDC.

For example, when the multiplexer 120 outputs the first voltage V1 as the temperature coefficient voltage VTC, the digital processor 160 may receive the first digital time information D_TDC1 from the time-digital converter 150. When the multiplexer 120 outputs the second voltage V2 as the temperature coefficient voltage VTC, the digital processor 160 may receive the second digital time information D_TDC2.

The digital processor 160 may calculate a ratio of the first digital time information D_TDC1 and the second digital time information D_TDC2 and may output a result of the calculation as the digital temperature D_TEMP. The digital processor 160 may adjust a level of the transition signal S_TRAN in response to the clock signal CLK.

The digital processor 160 may provide a trim signal S_TRIM to the temperature-voltage converter 110. The trim signal S_TRIM may be a signal for adjusting a resistance value of an internal resistor of the temperature-voltage converter 110. The trim signal S_TRIM may include two or more bits.

For example, the digital processor 160 may include a memory that stores a trim code. The digital processor 160 may generate the trim signal S_TRIM depending on the trim code stored in the memory. The trim code may be stored in the memory upon manufacturing the temperature sensing device 100. The memory may include a nonvolatile memory.

A conventional temperature sensing device calculates a temperature by using an analog-digital converter. The analog-digital converter needs a high power supply voltage, and thus, the conventional temperature sensing device needs a high power supply voltage.

The temperature sensor 130 of the temperature sensing device 100 of the disclosure calculates the digital temperature D_TEMP through voltage-time conversion and time-digital conversion without using the analog-digital converter. Accordingly, compared with a temperature sensing device using the analog-digital converter, the temperature sensing device 100 may calculate the digital temperature D_TEMP by using a lower power supply voltage.

Figure 3:
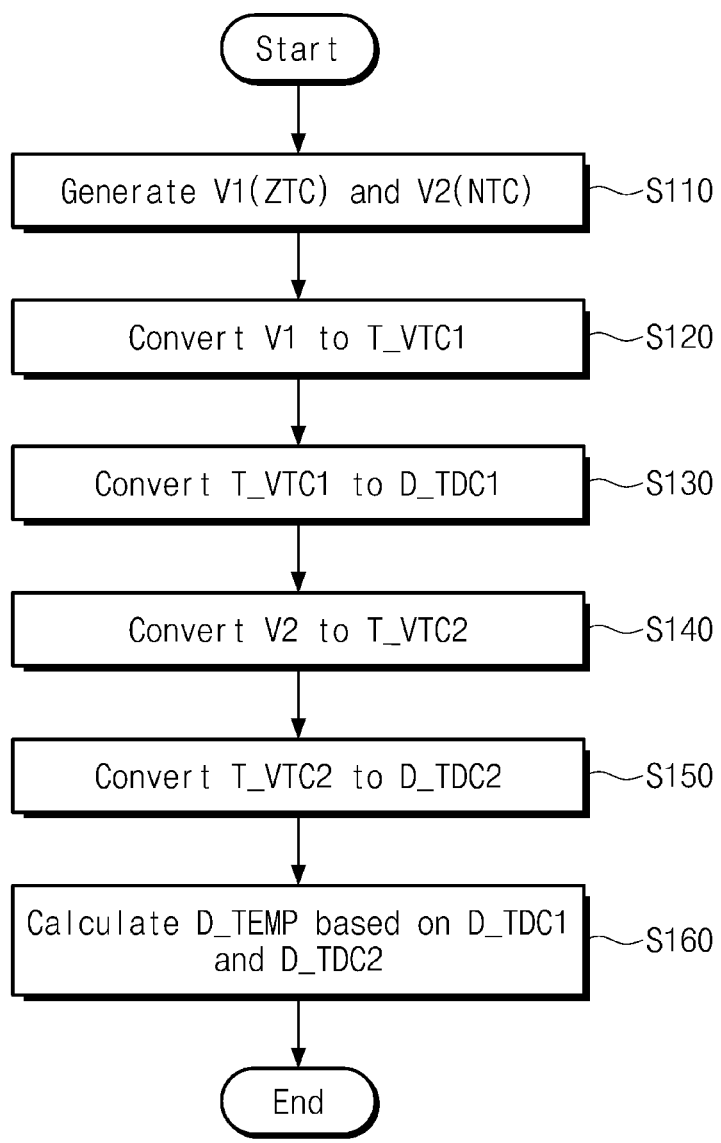
FIG. 3 is a flowchart illustrating an operating method of a temperature sensing device according to an embodiment of the disclosure.

FIG. 3 is a flowchart illustrating an operating method of the temperature sensing device 100 according to an embodiment of the disclosure. Referring to FIGS. 1 and 3, in operation S110, the temperature-voltage converter 110 may generate the first voltage V1 having the zero temperature coefficient ZTC and the second voltage V2 having the negative temperature coefficient NTC.

When the multiplexer 120 outputs the first voltage V1, in operation S120, the voltage-time converter 140 may convert the first voltage V1 to the first time information T_VTC1. In operation S130, the time-digital converter 150 may convert the first time information T_VTC1 to the first digital time information D_TDC1.

When the multiplexer 120 outputs the second voltage V2, in operation S140, the voltage-time converter 140 may convert the second voltage V2 to the second time information T_VTC2. In operation S150, the time-digital converter 150 may convert the second time information T_VTC2 to the second digital time information D_TDC2.

After the first digital time information D_TDC1 and the second digital time information D_TDC2 are obtained, in operation S160, the digital processor 160 may calculate the digital temperature D_TEMP based on the first digital time information D_TDC1 and the second digital time information D_TDC2. The digital processor 160 may calculate the digital temperature D_TEMP depending on a ratio of the first digital time information D_TDC1 and the second digital time information D_TDC2.

Figure 4:
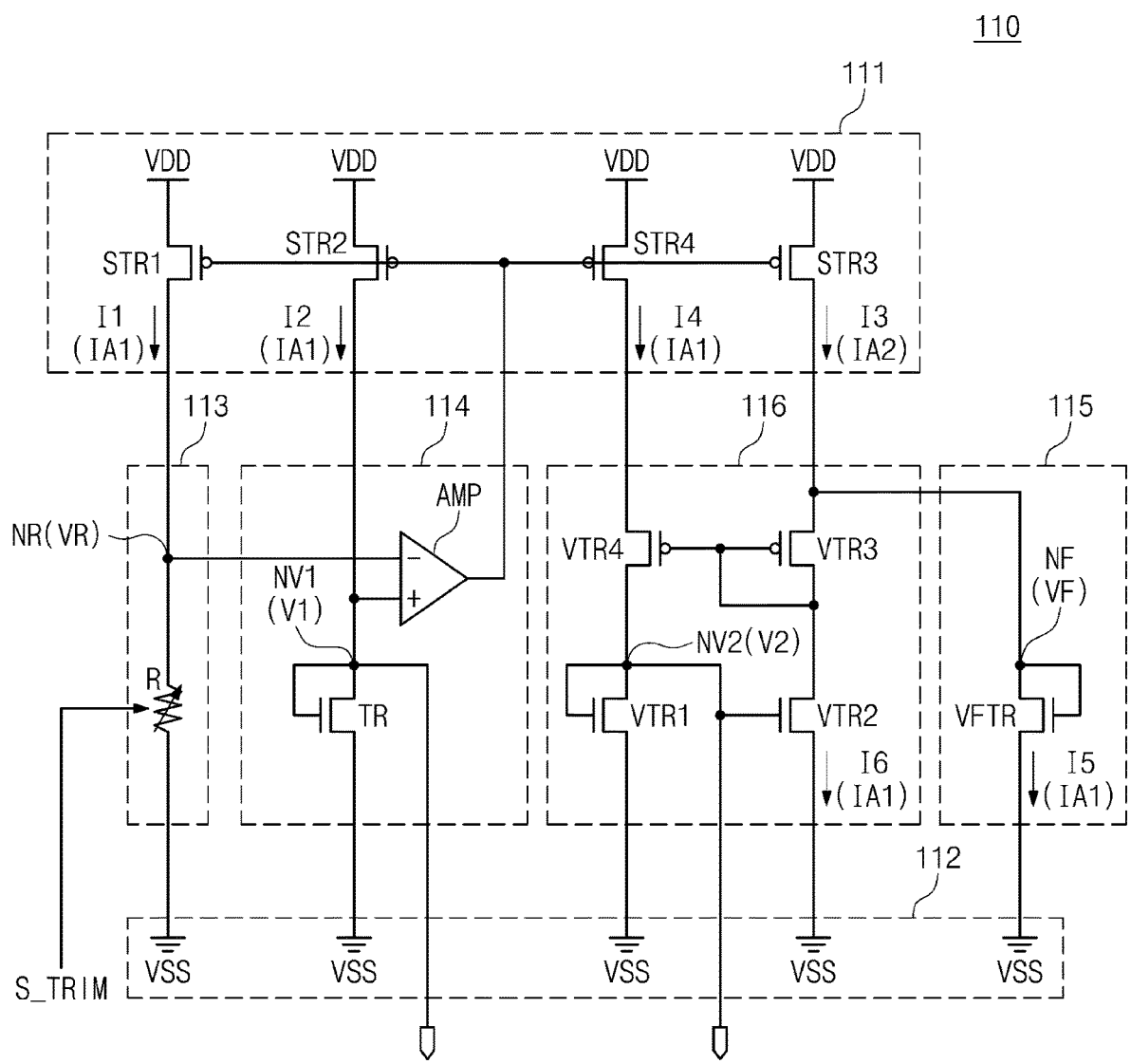
FIG. 4 illustrates an example of a temperature-voltage converter.

FIG. 4 illustrates an example of the temperature-voltage converter 110. Referring to FIGS. 1 and 4, the temperature-voltage converter 110 includes a current source 111, a ground node 112, a reference voltage generating block 113, a first voltage generating block 114, a voltage follower block 115, and a second voltage generating block 116.

The current source 111 is configured to output currents under control of a control voltage VCT. For example, the current source 111 may output a first current I1 having a first current amount IA1, a second current I2 having the first current amount IA1, a third current I3 having a second current amount IA2, and a fourth current I4 having the first current amount IA1.

The current source 111 includes first to fourth source transistors STR1 to STR4 controlled by the control voltage VCT. The first to fourth source transistors STR1 to STR4 may be PMOS transistors. The first source transistor STR1 may have a first end connected with a power node to which a power supply voltage VDD is supplied, a second end connected to the reference voltage generating block 113, and a gate controlled by the control voltage VCT.

The second source transistor STR2 may have a first end connected with the power node to which the power supply voltage VDD is supplied, a second end connected to the first voltage generating block 114, and a gate controlled by the control voltage VCT. The third source transistor STR3 may have a first end connected with the power node to which the power supply voltage VDD is supplied, a second end connected to the voltage follower block 115 and the second voltage generating block 116, and a gate controlled by the control voltage VCT.

The fourth source transistor STR4 may have a first end connected with the power node to which the power supply voltage VDD is supplied, a second end connected to the second voltage generating block 116, and a gate controlled by the control voltage VCT.

The first, second, and fourth source transistors STR1, STR2, and STR4 may have the same size. The first, second, and fourth source transistors STR1, STR2, and STR4 may supply the first, second, and fourth currents I1, I2, and I4, each of which has the first current amount IA1, depending on the control voltage VCT.

The size of the third source transistor STR3 may be larger than the size of each of the first, second, and fourth source transistors STR1, STR2, and STR4. For example, a width of the third source transistor STR3 may be two times a width of each of the first, second, and fourth source transistors STR1, STR2, and STR4. The third source transistor STR3 may supply the third current I3 having the second current amount IA2 that is greater than the first current amount IA1. For example, the second current amount IA2 may be two times the first current amount IA1.

The ground node 112 may include one or more nodes for supplying a ground voltage VSS. The ground node 112 may supply the ground voltage VSS to the reference voltage generating block 113, the first voltage generating block 114, the voltage follower block 115, and the second voltage generating block 116.

The reference voltage generating block 113 may include a resistor "R". The resistor "R" is connected between the current source 111 and the ground node 112. The resistor "R" may receive the first current I1 from the first source transistor STR1. The resistor "R" may be a variable resistor, the resistance value of which is adjusted by the trim signal S_TRIM. For example, a resistance value of the resistor "R" may be adjusted such that a reference voltage VR has the zero temperature coefficient voltage VZTC by the first current I1 and the resistance value of the resistor "R".

The first voltage generating block 114 may include a transistor TR and an amplifier AMP. The transistor TR may include a first end connected with the second end of the second source transistor STR2 of the current source 111, a second end connected with the ground node 112, and a gate connected with the first end of the transistor TR.

The amplifier AMP may include a positive input to which a voltage of the first end of the transistor TR is applied and a negative input to which the reference voltage VR is applied. An output of the amplifier AMP may be output to the gates of the first to fourth source transistors STR1 to STR4 as the control voltage VCT.

The first end of the transistor TR may correspond to a first voltage node NV1. The first voltage V1 of the first voltage node NV1 may be output to the multiplexer 120. A reference node NR and the first voltage node NV1 may be virtually shorted by the amplifier AMP.

Accordingly, the first voltage V1 may be identical to the reference voltage VR and may have the zero temperature coefficient ZTC. If the first voltage V1 has the zero temperature coefficient ZTC, the first current amount IA1 or the second current amount IA2 may have the zero temperature coefficient ZTC that does not vary with a temperature.

The voltage follower block 115 may include a voltage follower transistor VFTR. The voltage follower transistor VFTR has a first end connected with the current source 111, a second end connected with the ground node 112, and a gate connected with the first end of the voltage follower transistor VFTR. The voltage follower transistor VFTR may have the same size as the transistor TR of the first voltage generating block 114, for example, the same gate width and the same length.

The voltage follower transistor VFTR has the same size of the transistor TR and has the same connection structure as the transistor TR. Like the transistor TR, thus, a fifth current I5 having the first current amount IA1 may flow in the voltage follower transistor VFTR. That is, the voltage follower transistor VFTR may drain the fifth current I5 having the first current amount IA1 from the third current I3 having the second current amount IA2.

Like the event that the second current I2 having the first current amount IA1 flows in the transistor TR, the fifth current I5 having the first current amount IA1 flows in the voltage follower transistor VFTR. Accordingly, a follower voltage VF of a follower node NF is identical to the first voltage V1 of the first voltage node NV1. That is, the voltage follower block 115 may drain the fifth current I5 having the first current amount IA1 from the third current I3 and may provide the first voltage V1 to the second voltage generating block 116.

The second voltage generating block 116 includes first to fourth voltage transistors VTR1 to VTR4. The first voltage transistor VTR1 has a first end connected with a second end of the fourth voltage transistor VTR4, a second end connected with the ground node 112, and a gate connected with the first end of the first voltage transistor VTR1.

The second voltage transistor VTR2 has a first end connected with a second end of the third voltage transistor VTR3, a second end connected with the ground node 112, and a gate connected with the first end of the first voltage transistor VTR1. The third voltage transistor VTR3 has a first end connected with the second end of the third source transistor STR3 of the current source 111, a second end connected with the first end of the second voltage transistor VTR2, and a gate connected with the second end of the third voltage transistor VTR3.

The fourth voltage transistor VTR4 has a first end connected with the second end of the fourth source transistor STR4 of the current source 111, a second end connected with the first end of the first voltage transistor VTR1, and a gate connected with the gate of the third voltage transistor VTR3. The fourth current I4 may flow through the first and fourth voltage transistors VTR1 and VTR4.

A sixth current I6 obtained by subtracting the fifth current I5 from the third current I3 may flow through the second and third voltage transistors VTR2 and VTR3. For example, the sixth current I6 may have the first current amount IA1.

The first and second voltage transistors VTR1 and VTR2 may have the same size, for example, the same gate width and the same gate length. The first voltage transistor VTR1 may mirror the fourth current I4 to the second voltage transistor VTR2. That is, the first voltage transistor VTR1 may control the second voltage transistor VTR2 such that a current having the first current amount IA1 flows through the second and third voltage transistors VTR2 and VTR3.

The first end of the first voltage transistor VTR1 may correspond to a second voltage node NV2. The second voltage V2 of the second voltage node NV2 may be output to the multiplexer 120. To allow the second voltage V2 to be lower than the first voltage V1, the size (e.g., a gate width) of the first and second voltage transistors VTR1 and VTR2 may be designed to be larger than the size (e.g., a gate width) of the transistor TR.

The first voltage of the voltage follower block 115 may be provided to the first end of the third voltage transistor VTR3. The third voltage transistor VTR3 may mirror the first voltage V1 to the fourth voltage transistor VTR4. A voltage of the first end of the fourth voltage transistor VTR4 may be identical to a voltage of the first end of the third voltage transistor VTR3. That is, the voltage of the first end of the fourth voltage transistor VTR4 may be the first voltage V1.

If the voltage of the first end of the fourth voltage transistor VTR4 is the first voltage V1, the second voltage V2 of the second voltage node NV2 may be lower than the first voltage V1 due to a voltage drop of the fourth voltage transistor VTR4. That is, the second voltage V2 is lower than the first voltage V1 and has a negative temperature coefficient.

Since the first voltage V1 has the zero temperature coefficient ZTC, if a temperature varies, a level of the second voltage V2 may vary with the negative temperature coefficient NTC. That is, the change in the second voltage V2 may indicate the change in the temperature.

Referring to FIGS. 2 and 4, the resistance value of the resistor "R" may be adjusted to allow the first current amount IA1 to correspond to the amount of the zero temperature coefficient current IZTC or to allow the first voltage V1 to correspond to the zero temperature coefficient voltage VZTC. For example, the resistance value of the resistor "R" may be adjusted while measuring the first current amount IA1 or the first voltage V1. Accordingly, the first voltage V1 may have the zero temperature coefficient ZTC. The second voltage V2 is adjusted to be lower than the first voltage V1. Accordingly, the second voltage V2 may have the negative temperature coefficient NTC.

As illustrated in FIG. 4, the first voltage V1 and the second voltage V2 are generated by using the power supply voltage VDD and the ground voltage VSS. Any other voltage that is higher than the power supply voltage VDD is not used to generate the first voltage V1 and the second voltage V2. Accordingly, the temperature-voltage converter 110 may be implemented to operate in an environment in which the power supply voltage VDD is low (e.g., 1.2 V or lower).

Figure 5:
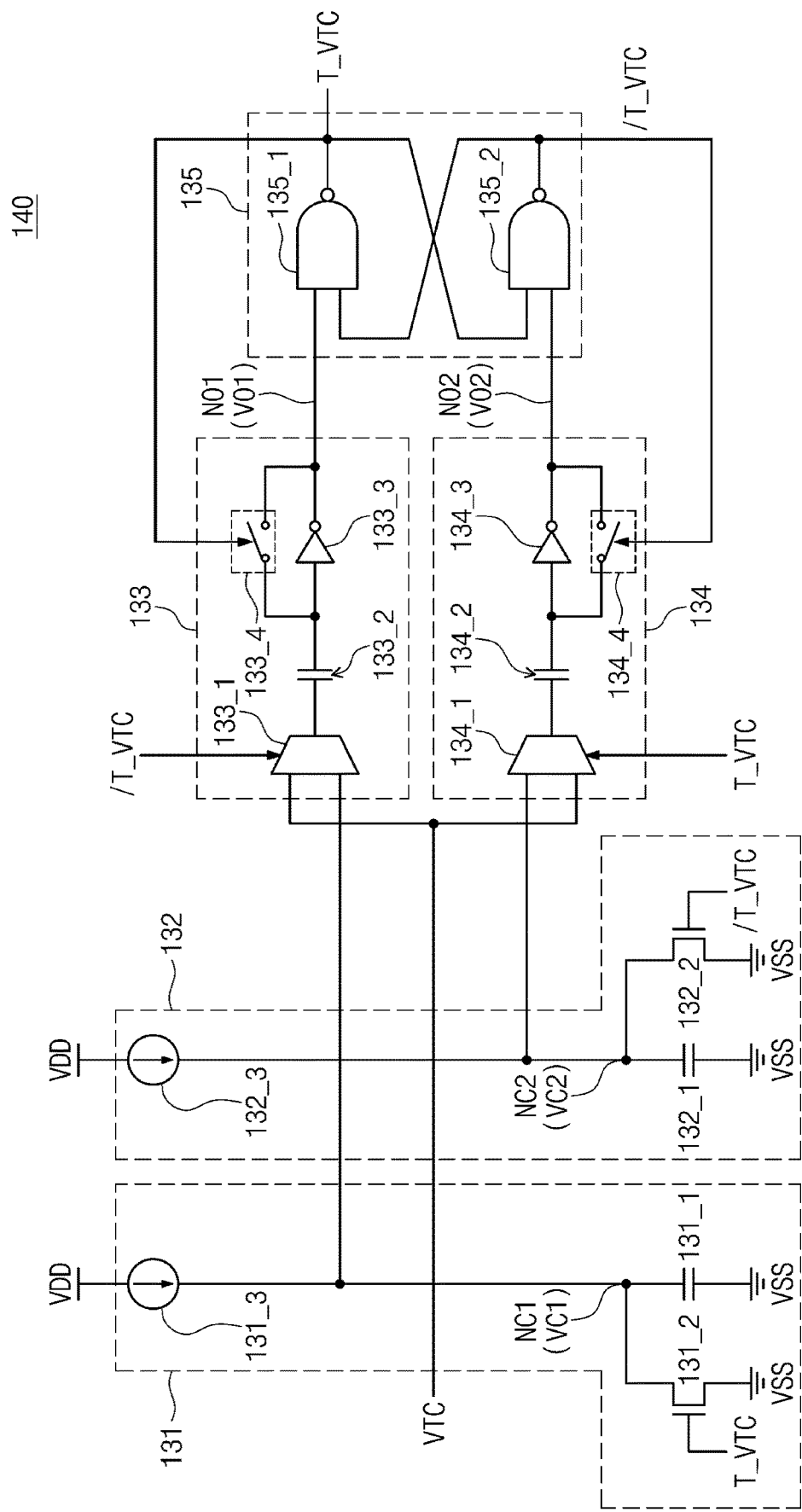
FIG. 5 illustrates a voltage-time converter according to an embodiment of the disclosure.

FIG. 5 illustrates the voltage-time converter 140 according to an embodiment of the disclosure. Referring to FIGS. 2 and 5, the voltage-time converter 140 may generate time information T_VTC and inverted time information /T_VTC from the temperature coefficient voltage VTC. The time information T_VTC may include first and second time information T_VTC1 and T_VTC2, and the inverted time information /T_VTC may include first and second inverted time information /T_VTC1 and /T_VTC2.

For example, when the multiplexer 120 outputs the first voltage V1, the voltage-time converter 140 may generate the first time information T_VTC1 and the first inverted time information /T_VTC1, which have a period (e.g., half a period) corresponding to a level of the first voltage V1. When the multiplexer 120 outputs the second voltage V2, the voltage-time converter 140 may generate the second time information T_VTC2 and the second inverted time information /T_VTC2, which have a period corresponding to a level of the second voltage V2.

The voltage-time converter 140 includes a first voltage generating block 131, a second voltage generating block 132, a first comparison block 133, a second comparison block 134, and a latch 135. The first voltage generating block 131 is configured to generate a first comparison voltage VC1 from the time information T_VTC.

For example, when the time information T_VTC is at a high level, the first voltage generating block 131 may maintain the first comparison voltage VC1 at the low level. When the time information T_VTC is at a low level, the first voltage generating block 131 may continuously increase the first comparison voltage VC1 from the low level.

The first voltage generating block 131 includes a first comparison capacitor 131_1, a first comparison transistor 131_2, and a first comparison current source 131_3. The first comparison capacitor 131_1 is connected between a first comparison node NC1 and a ground node to which the ground voltage VSS is supplied. The first comparison transistor 131_2 may be connected between the first comparison node NC1 and the ground node in parallel with the first comparison capacitor 131_1. The gate of the first comparison transistor 131_2 may receive the time information T_VTC.

The first comparison current source 131_3 is connected between a power node supplied with the power supply voltage VDD and the first comparison node NC1. The first voltage generating block 131 may output a voltage of the first comparison node NC1 as the first comparison voltage VC1.

The second voltage generating block 132 is configured to generate a second comparison voltage VC2 from the inverted time information /T_VTC. For example, when the inverted time information T_VTC is at the high level, the second voltage generating block 132 may maintain the second comparison voltage VC2 at the low level. When the inverted time information /T_VTC is at the low level, the second voltage generating block 132 may continuously increase the second comparison voltage VC2 from the low level.

The second voltage generating block 132 includes a second comparison capacitor 132_1, a second comparison transistor 132_2, and a second comparison current source 132_3. The second comparison capacitor 132_1 is connected between a second comparison node NC2 and the ground node. The second comparison transistor 132_2 may be connected between the second comparison node NC2 and the ground node in parallel with the second comparison capacitor 132_1. The gate of the second comparison transistor 132_2 may receive the inverted time information /T_VTC.

The second comparison current source 132_3 is connected between the power node supplied with the power supply voltage VDD and the second comparison node NC2. The second voltage generating block 132 may output a voltage of the second comparison node NC2 as the second comparison voltage VC2.

The first comparison block 133 may compare the first comparison voltage VC1 and the temperature coefficient voltage VTC in response to the time information T_VTC and the inverted time information /T_VTC. As a result of the comparison, the first comparison block 133 may output a first output voltage V01.

For example, when the time information T_VTC is at the high level and the inverted time information /T_VTC is at the low level, the first comparison block 133 may store the temperature coefficient voltage VTC. When the time information T_VTC is at the low level and the inverted time information /T_VTC is at the high level, the first comparison block 133 may compare the first comparison voltage VC1 and the temperature coefficient voltage VTC.

If the first comparison voltage VC1 increases and reaches the temperature coefficient voltage VTC, the first comparison block 133 may make the first output voltage V01 transition from the high level to the low level. The first comparison block 133 includes a first comparison multiplexer 133_1, a third comparison capacitor 133_2, a first comparison inverter 133_3, and a first comparison switch 133_4. The first comparison multiplexer 133_1 may receive the temperature coefficient voltage VTC and the first comparison voltage VC1.

When the inverted time information /T_VTC is at the low level, the first comparison multiplexer 133_1 may output the temperature coefficient voltage VTC. When the inverted time information /T_VTC is at the high level, the first comparison multiplexer 133_1 may output the first comparison voltage VC1. The third comparison capacitor 133_2 is connected between the first comparison multiplexer 133_1 and the first comparison inverter 133_3.

The first comparison inverter 133_3 is connected between a first output node NO1, from which the first output voltage V01 is output, and the third comparison capacitor 133_2. The first comparison switch 133_4 may be connected between the third comparison capacitor 133_2 and the first output node NO1 in parallel with the first comparison inverter 133_3.

The first comparison switch 133_4 operates in response to the time information T_VTC. When the time information T_VTC is at the high level, the first comparison switch 133_4 may be short-circuited. When the time information T_VTC is at the high level, the first comparison switch 133_4 may be opened.

The second comparison block 134 may compare the second comparison voltage VC2 and the temperature coefficient voltage VTC in response to the time information T_VTC and the inverted time information /T_VTC. As a result of the comparison, the second comparison block 134 may output a second output voltage V02.

For example, when the time information T_VTC is at the low level and the inverted time information /T_VTC is at the high level, the second comparison block 134 may store the temperature coefficient voltage VTC. When the time information T_VTC is at the high level and the inverted time information /T_VTC is at the low level, the second comparison block 134 may compare the second comparison voltage VC2 and the temperature coefficient voltage VTC.

If the second comparison voltage VC2 increases and reaches the temperature coefficient voltage VTC, the second comparison block 134 may make the second output voltage VO2 transition from the high level to the low level. That is, the second output voltage VO2 may be a pulse signal having a period corresponding to a level of the temperature coefficient voltage VTC.

The second comparison block 134 includes a second comparison multiplexer 134_1, a fourth comparison capacitor 134_2, a second comparison inverter 134_3, and a second comparison switch 134_4. The second comparison multiplexer 134_1 may receive the temperature coefficient voltage VTC and the second comparison voltage VC2.

When the time information T_VTC is at the low level, the second comparison multiplexer 134_1 may store the temperature coefficient voltage VTC. When the time information T_VTC is at the high level, the second comparison multiplexer 134_1 may output the second comparison voltage VC2. The fourth comparison capacitor 134_2 is connected between the second comparison multiplexer 134_1 and the second comparison inverter 134_3.

The second comparison inverter 134_3 is connected between a second output node NO2, from which the second output voltage VO2 is output, and the fourth comparison capacitor 134_2. The second comparison switch 134_4 may be connected between the fourth comparison capacitor 134_2 and the second output node NO2 in parallel with the second comparison inverter 134_3.

The second comparison switch 134_4 operates in response to the inverted time information /T_VTC. When the inverted time information /T_VTC is at the high level, the second comparison switch 134_4 may be short-circuited. When the inverted time information /T_VTC is at the low level, the second comparison switch 134_4 may be opened.

The latch 135 may be a reset latch that receives the first output voltage V01 as a set signal and the second output voltage VO2 as a reset signal. The latch 135 includes a first NAND gate 135_1 and a second NAND gate 135_2. The first NAND gate 135_1 may receive the first output voltage V01 and the inverted time information /T_VTC and may output the time information T_VTC. The second NAND gate 135_2 may receive the second output voltage VO2 and the time information T_VTC and may output the inverted time information /T_VTC.

Figure 6:
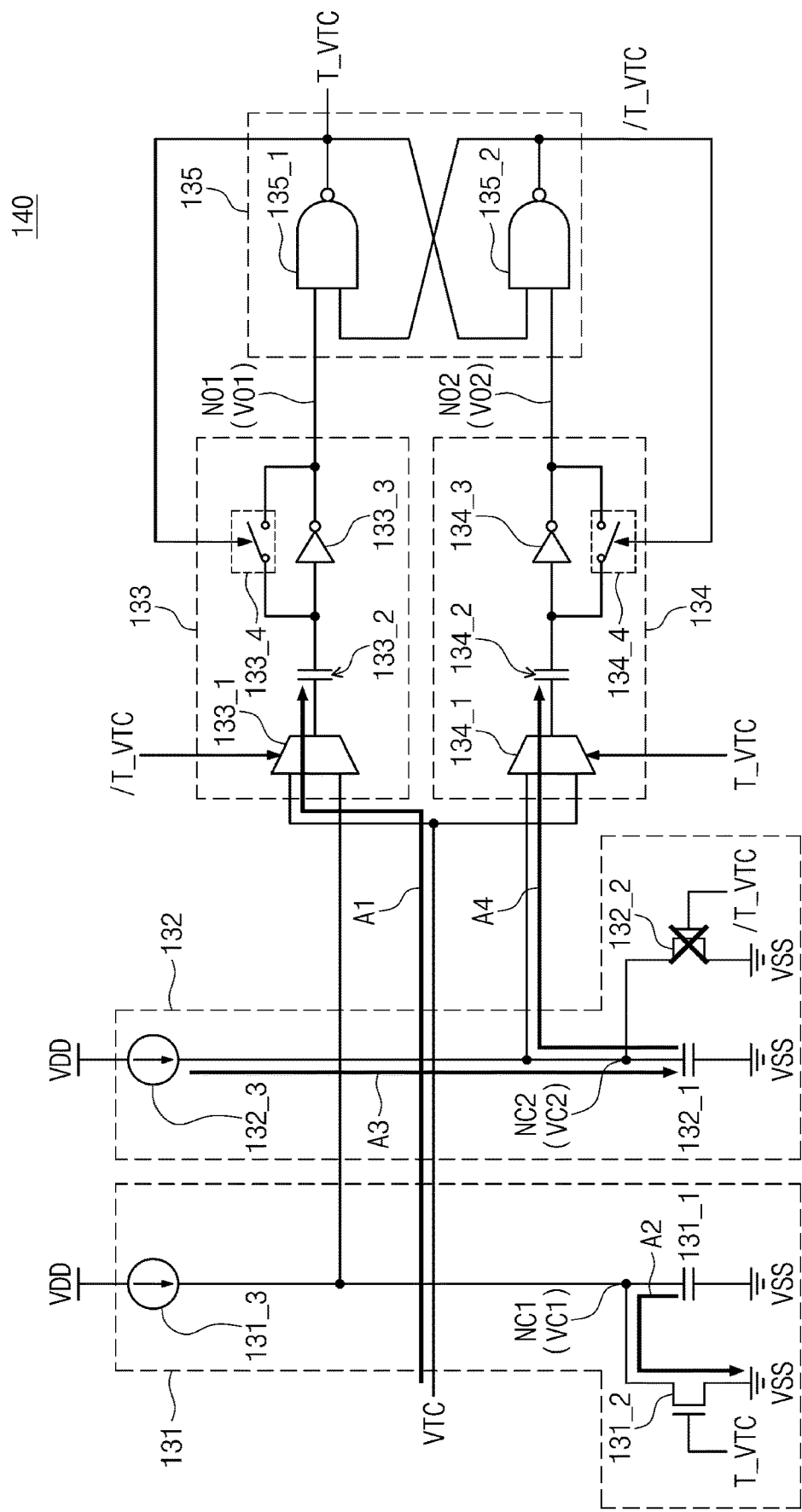
FIG. 6 illustrates an example in which a voltage-time converter operates in a first phase.

FIG. 6 illustrates an example in which the voltage-time converter 140 operates in a first phase. For example, as the time information T_VTC transitions from the low level to the high level and the inverted time information /T_VTC transitions from the high level to the low level, the voltage-time converter 140 may enter a first phase.

In the first voltage generating block 131, the first comparison transistor 131_2 may be turned on in response to the time information T_VTC. Accordingly, as marked by the second arrow A2, the first comparison voltage VC1 may be maintained at a ground voltage. The first comparison multiplexer 133_1 of the first comparison block 133 may output the temperature coefficient voltage VTC in response to the inverted time information /T_VTC as marked by the first arrow A1. In this case, the temperature coefficient voltage VTC may be charged in the third comparison capacitor 133_2.

The first comparison switch 133_4 of the first comparison block 133 may be short-circuited in response to the time information T_VTC. Voltages of an input and an output (e.g., NO1) of the first comparison inverter 133_3 may be equalized to a logic threshold of the first comparison inverter 133_3. For example, the logic threshold of the first comparison inverter 133_3 may correspond to an intermediate voltage between an input voltage, which allows the first comparison inverter 133_3 to output the low level, and an input voltage, which allows the first comparison inverter 133_3 to output the high level.

For example, when an input of the first comparison inverter 133_3 is lower than the logic threshold, the first comparison inverter 133_3 to output the high level. When the input of the first comparison inverter 133_3 is higher than the logic threshold, the first comparison inverter 133_3 may output the low level.

Figure 7:
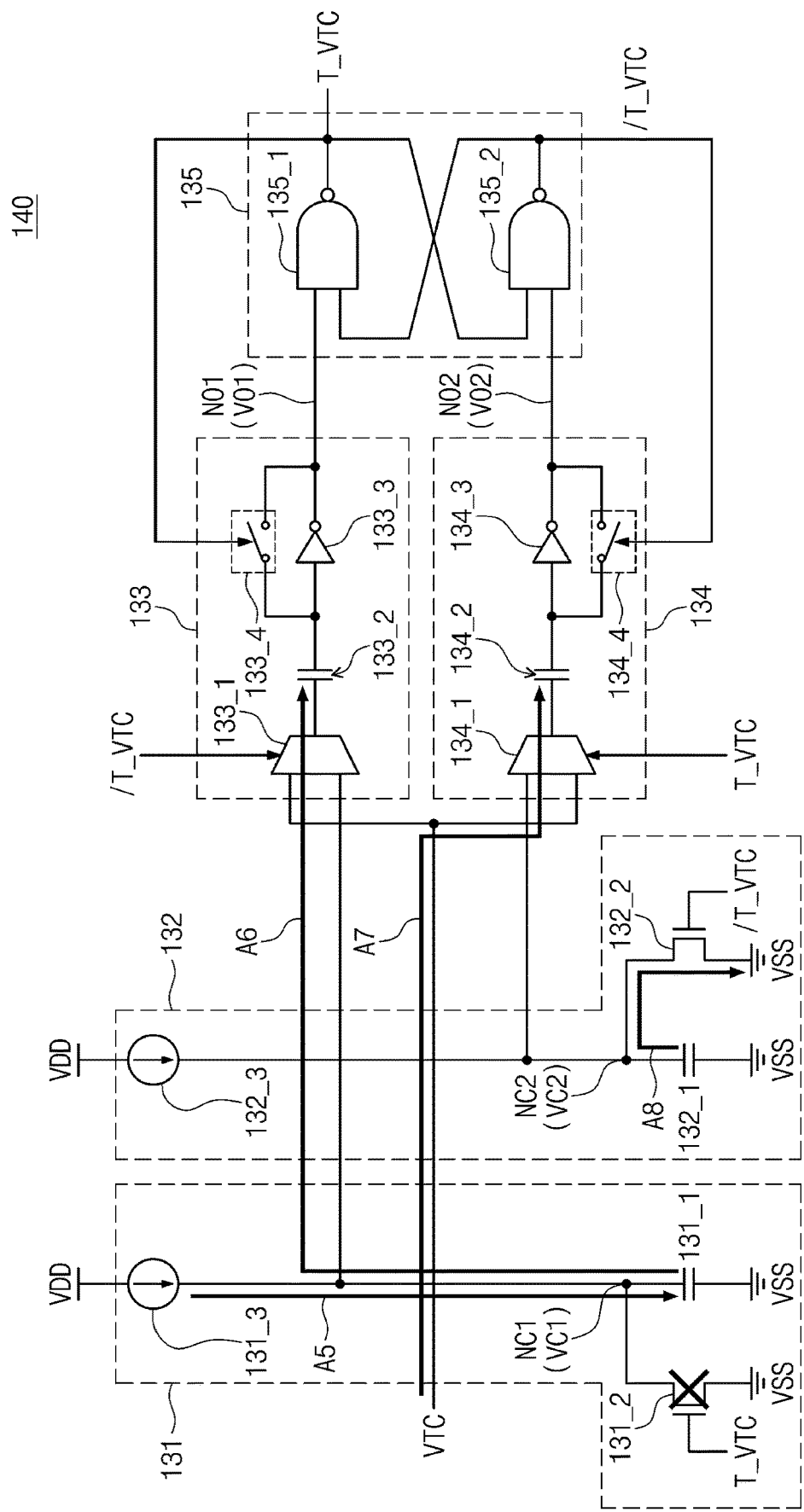
FIG. 7 illustrates an example in which a voltage-time converter operates in a second phase.

FIG. 7 illustrates an example in which the voltage-time converter 140 operates in a second phase. For example, as the time information T_VTC transitions from the high level to the low level and the inverted time information /T_VTC transitions from the low level to the high level, the voltage-time converter 140 may enter a second phase.

In the second phase, the first comparison transistor 131_2 of the first voltage generating block 131 may be turned off in response to the time information T_VTC. Accordingly, as marked by the fifth arrow A5, a voltage is charged in the first comparison capacitor 131_1 by the first comparison current source 131_3. That is, the first comparison voltage VC1 continuously increases from the ground voltage VSS.

The first comparison multiplexer 133_1 of the first comparison block 133 may output the first comparison voltage VC1 in response to the inverted time information /T_VTC as marked by the sixth arrow A6. When the inverted time information /T_VTC transitions from the low level to the high level, the first comparison voltage VC1 is the ground voltage VSS. Accordingly, the first comparison multiplexer 133_1 converts an output voltage from the temperature coefficient voltage VTC being a positive voltage to the ground voltage VSS.

As the output voltage of the first comparison multiplexer 133_1 changes from the temperature coefficient voltage VTC to the ground voltage VSS, the first comparison inverter 133_3 may output the high level. After the inverted time information /T_VTC transitions to the high level, the first comparison voltage VC1 continuously increases from the ground voltage VSS.

If the first comparison voltage VC1 increases and is the temperature coefficient voltage VTC or higher, a voltage of the logic threshold or higher is provided to the first comparison inverter 133_3. Accordingly, the first comparison inverter 133_3 may output the first output voltage V01 of the low level, and thus, the latch 135 is set.

Referring to FIGS. 6 and 7, the second voltage generating block 132 and the second comparison block 134 operate to be similar to the first voltage generating block 131 and the first comparison block 133. For example, in the first phase, the second voltage generating block 132 may continuously increase the second comparison voltage VC2 from the ground voltage VSS as marked by the third arrow A3.

In the first phase, as marked by the fourth arrow A4, the second comparison block 134 may compare the second comparison voltage VC2 and the temperature coefficient voltage VTC. If the second comparison voltage VC2 is not lower than the temperature coefficient voltage VTC, the second comparison block 134 may adjust the second output voltage VO2 to the low level, and thus, the latch 135 may be reset.

In the second phase, as marked by the eighth arrow A8, the second voltage generating block 132 may maintain the second comparison voltage VC2 at the ground voltage VSS. The second comparison block 134 may charge the temperature coefficient voltage VTC in the fourth comparison capacitor 134_2 as marked by the seventh arrow A7.

Figure 8:
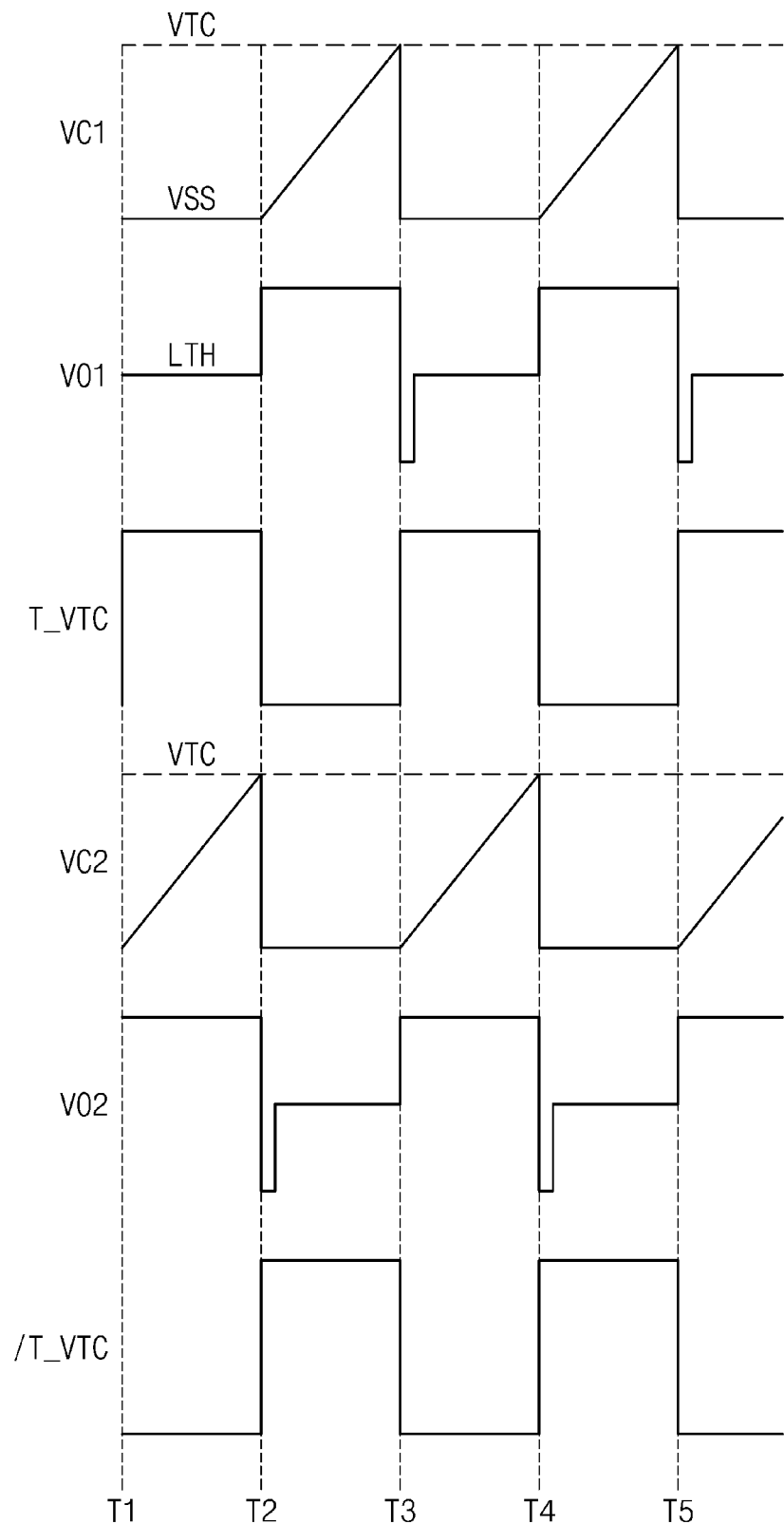
FIG. 8 illustrates changes in voltages of a voltage-time converter of FIGS. 5 to 7.

FIG. 8 illustrates changes in voltages of the voltage-time converter 140 of FIGS. 5 to 7. Referring to FIGS. 5 to 8, at a first time T1, the time information T_VTC may transition from the low level to the high level, and the inverted time information /T_VTC may transition from the high level to the low level. That is, at the first time T1, the voltage-time converter 140 may enter the first phase.

The first voltage generating block 131 may maintain the first comparison voltage VC1 at the ground voltage VSS. The second comparison block 133 may charge the temperature coefficient voltage VTC in the third comparison capacitor 133_2. The first output voltage VO1 may be maintained at the logic threshold LTH of the first comparison inverter 133_3.

The second voltage generating block 132 may continuously increase the second comparison voltage VC2 from the ground voltage VSS. During the event that the second comparison voltage VC2 is lower than the temperature coefficient voltage VTC, the second comparison inverter 134_3 may maintain the second output voltage VO2 at the high level.

If the second comparison voltage VC2 reaches the temperature coefficient voltage VTC, the second comparison inverter 134_3 may make the second output voltage VO2 transition to the low level. As the second output voltage VO2 transitions to the low level, the latch 135 is reset. The time information T_VTC may transition from the high level to the low level, and the inverted time information /T_VTC may transition from the low level to the high level. That is, the voltage-time converter 140 may enter the second phase.

In the second phase, the second voltage generating block 132 may maintain the second comparison voltage VC2 at the ground voltage VSS. The second comparison block 134 may charge the temperature coefficient voltage VTC in the fourth comparison capacitor 134_2. The second output voltage VO2 may be maintained at the logic threshold LTH of the second comparison inverter 134_3.

The first voltage generating block 131 may continuously increase the first comparison voltage VC1 from the ground voltage VSS. During the event that the first comparison voltage VC1 is lower than the temperature coefficient voltage VTC, the first comparison inverter 133_3 may maintain the first output voltage VO1 at the high level.

If the first comparison voltage VC1 reaches the temperature coefficient voltage VTC, the first comparison inverter 133_3 may make the first output voltage VO1 transition to the low level. As the first output voltage VO1 transitions to the low level, the latch 135 is set. The time information T_VTC may transition from the low level to the high level, and the inverted time information /T_VTC may transition from the high level to the low level. That is, the voltage-time converter 140 may enter the first phase.

During a time period from the first time T1 to a fifth time T5, the latch 135 may be periodically set and reset through comparison of the temperature coefficient voltage VTC and the first comparison voltage VC1 and comparison of the temperature coefficient voltage VTC and the second comparison voltage VC2. The time information T_VTC may have half the period corresponding to a time when the first comparison voltage VC reaches the temperature coefficient voltage VTC. That is, the time information T_VTC may have a period associated with the temperature coefficient voltage VTC.

When the multiplexer 120 outputs the first voltage V1 as the temperature coefficient voltage VTC, the first time information T_VTC1 may have a first period. When the multiplexer 120 outputs the second voltage V2 as the temperature coefficient voltage VTC, the second time information T_VTC2 may have a second period shorter than the first period. That is, the voltage-time converter 140 may convert a voltage to a time (e.g., a period).

Figure 9:
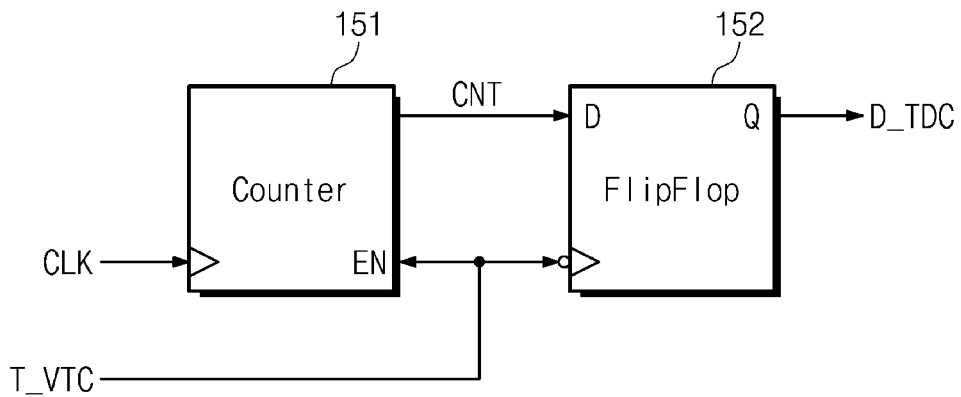
FIG. 9 illustrates a time-digital converter according to an embodiment of the disclosure.

FIG. 9 illustrates a time-digital converter 150a according to an embodiment of the disclosure. Referring to FIGS. 1 and 9, the time-digital converter 150a includes a counter 151 and a flip-flop 152. The counter 151 may receive the clock signal CLK and the time information T_VTC.

The time information T_VTC may be provided as an enable signal EN of the counter 151. While the time information T_VTC is activated (e.g., at the high level), the counter 151 may increase a count CNT in response to the clock signal CLK.

The flip-flop 152 may receive the count CNT and the time information T_VTC. The count CNT may be applied to an input "D" of the flip-flop 152. When the time information T_VTC is deactivated, for example, when the time information T_VTC transitions from the high level to the low level, the flip-flop 152 may output the count CNT as the digital time information D_TDC through an output "Q" thereof.

Figure 10:
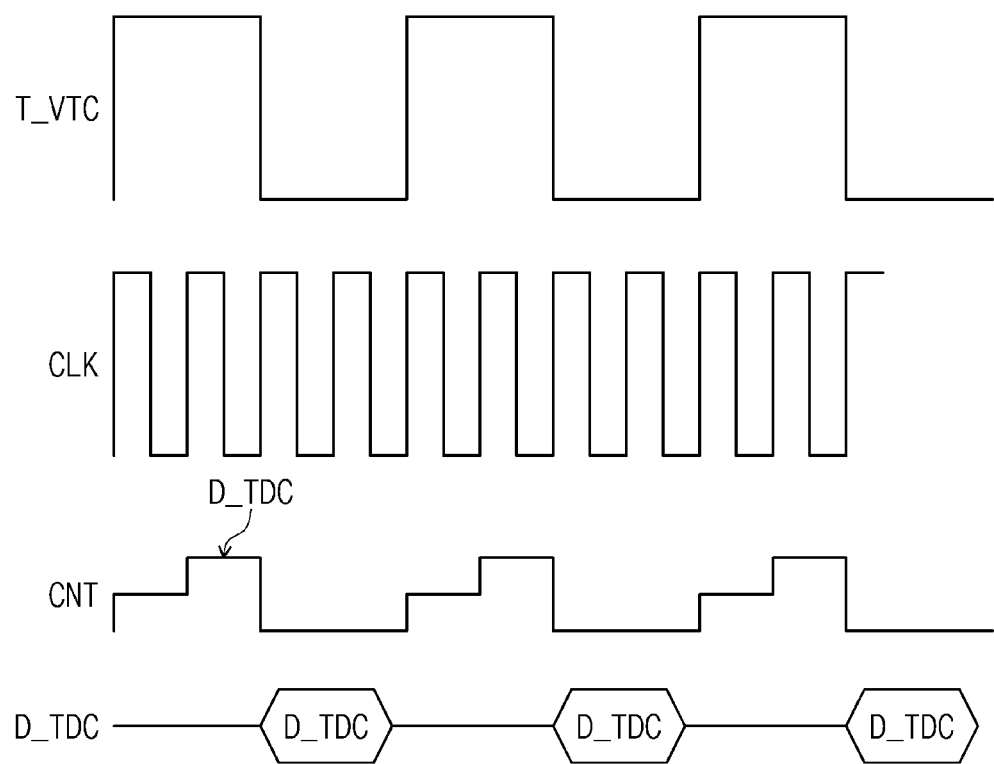
FIG. 10 illustrates an operation in which a time-digital converter of FIG. 9 operates.

FIG. 10 illustrates an operation in which the time-digital converter 150a of FIG. 9 operates. Referring to FIGS. 9 and 10, the clock signal CLK may swing between the high level and the low level (e.g., may periodically have a low-to-high transition and a high-to-low transition). While the time information T_VTC is at the high level, the counter 151 may increase the count CNT in response to the clock signal CLK.

For example, if the time information T_VTC is at the high level during two cycles of the clock signal CLK, the counter 151 may increase the count CNT two times. When the time information T_VTC transitions to the low level, the flip-flop 152 may output the count CNT as the digital time information D_TDC. The counter 151 may initialize the count CNT.

Figure 11:
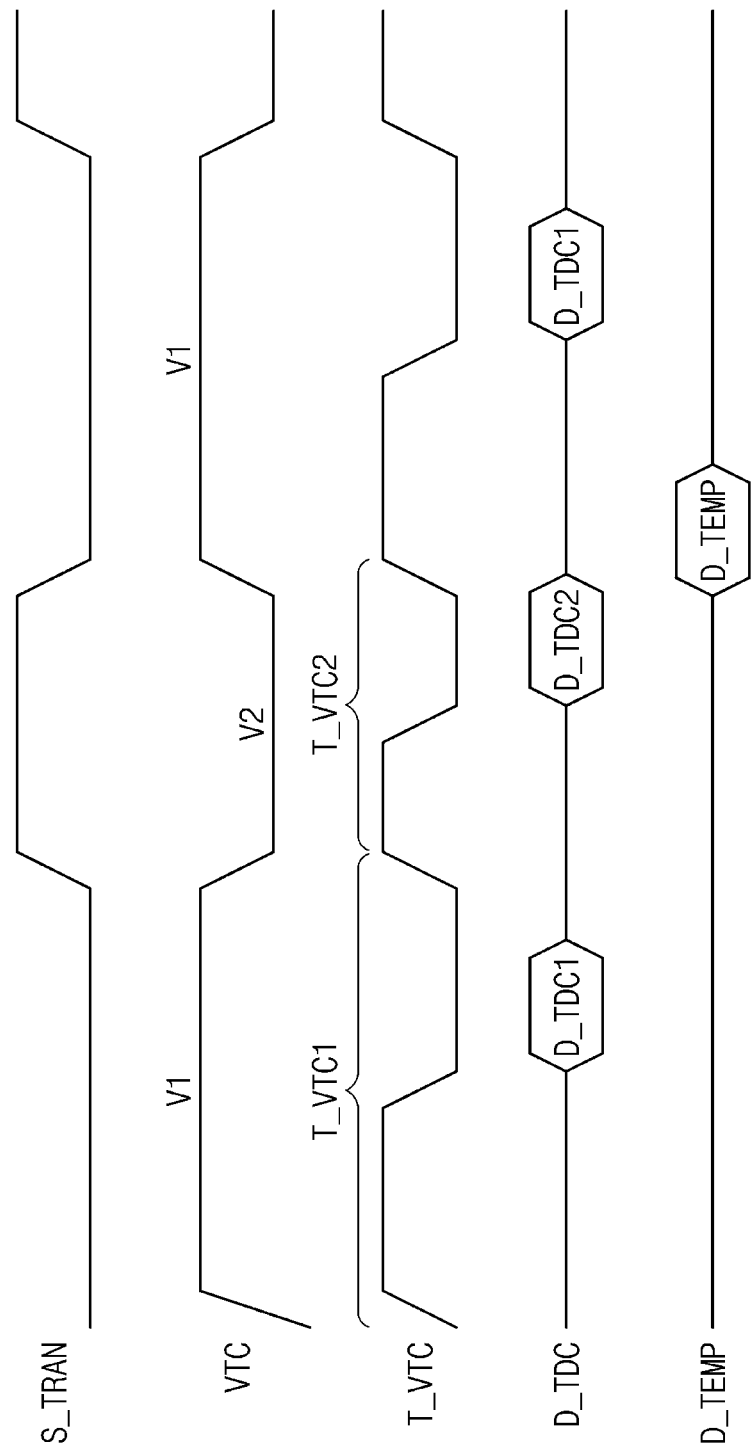
FIG. 11 illustrates an example in which a temperature sensing device of FIG. 1 operates.

FIG. 11 illustrates an example in which the temperature sensing device 100 of FIG. 1 operates. Referring to FIGS. 1 and 11, the digital processor 160 may alternately adjust the transition signal S_TRAN to the low level and the high level. For example, the digital processor 160 may allow the transition signal S_TRAN to transition upon receiving the digital time information D_TDC from the time-digital converter 150. For another example, the digital processor 160 may allow the transition signal S_TRAN to transition periodically.

When the transition signal S_TRAN is at the low level, the multiplexer 120 may output the first voltage V1 as the temperature coefficient voltage VTC. When the multiplexer 120 outputs the first voltage V1, the voltage-time converter 140 may output the first time information T_VTC1. The first time information T_VTC1 may have a period corresponding to a level of the first voltage V1.

The time-digital converter 150 may convert the first time information T_VTC1 to the first digital time information D_TDC1. The digital processor 160 may store the first digital time information D_TDC1.

When the transition signal S_TRAN is at the high level, the multiplexer 120 may output the second voltage V2 as the temperature coefficient voltage VTC. When the multiplexer 120 outputs the second voltage V2, the voltage-time converter 140 may output the second time information T_VTC2. The second time information T_VTC2 may have a period corresponding to a level of the second voltage V2.

The time-digital converter 150 may convert the second time information T_VTC2 to the second digital time information D_TDC2. The digital processor 160 may store the second digital time information D_TDC2. The digital processor 160 may calculate the digital temperature D_TEMP depending on Equation 1.

$$D\_TEMP = A \cdot \frac{D\_TDC1 - D\_TDC2}{D\_TDC1} \quad \text{[Equation 1]}$$

In Equation 1, "A" may be any coefficient. The first digital time information D_TDC1 has a value corresponding to a level of the first voltage V1, and the second digital time information D_TDC2 has a value corresponding to a level of the second voltage V2. Accordingly, Equation 1 may be summarized in the form of Equation 2.

$$D\_TEMP = A \cdot \frac{D\_TDC1 - D\_TDC2}{D\_TDC1} = A \cdot \frac{V1 - V2}{V1} \quad \text{[Equation 2]}$$

The first voltage V1 has the zero temperature coefficient ZTC, and the second voltage V2 has the negative temperature coefficient NTC. Accordingly, a value that is obtained by subtracting the second voltage V2 from the first voltage V1 may have the positive temperature coefficient PTC.

The first voltage V1 and the second voltage V2 may have an error due to a process variable or an environment variable. The digital processor 160 according to an embodiment of the disclosure calculates the digital temperature D_TEMP depending on a ratio of the first voltage V1 and the second voltage V2. In this case, since the process variable and the environment variable are canceled out, the more accurate digital temperature D_TEMP is obtained.

Figure 12:
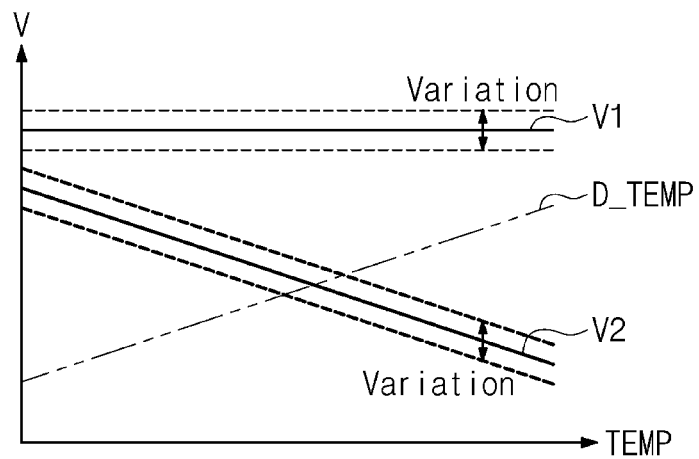
FIG. 12 illustrates an example of errors of a first voltage, a second voltage, and a digital temperature.

FIG. 12 illustrates an example of errors of the first voltage V1, the second voltage V2, and the digital temperature D_TEMP. In FIG. 12, a horizontal axis represents a temperature TEMP, and a vertical axis represents a voltage "V" or a value "V". Referring to FIGS. 1 and 12, the first voltage V1 does not vary with the temperature TEMP and has an error due to a process variable and an environment variable.

The second voltage V2 is in inverse proportion to the temperature TEMP and has an error due to a process variable and an environment variable. The digital temperature D_TEMP is in proportion to the temperature TEMP and has an error due to a process variable and an environment variable. Accordingly, the more accurate digital temperature D_TEMP is obtained.

Figure 13:
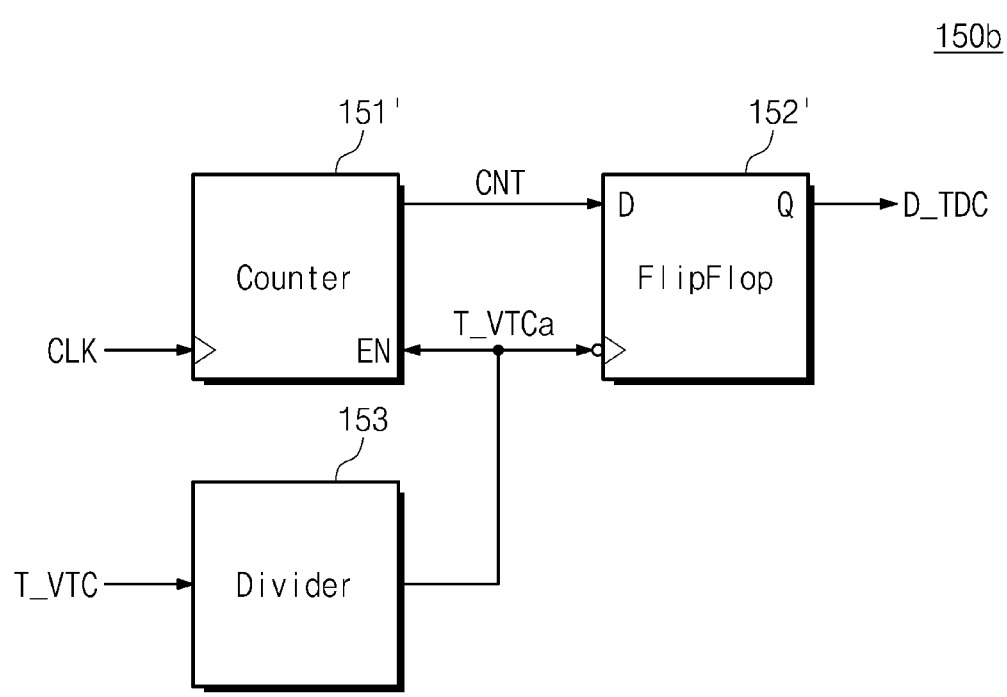
FIG. 13 illustrates a time-digital converter according to an application example of the disclosure.

FIG. 13 illustrates a time-digital converter 150b according to an application example of the disclosure. Referring to FIGS. 1 and 13, the time-digital converter 150b includes a counter 151', a flip-flop 152', and a divider 153. Compared with the time-digital converter 150a of FIG. 9, the time-digital converter 150b further includes the divider 153.

The divider 153 may divide the time information T_VTC to generate a divided time information T_VTCa. The counter 151' may receive the divided time information T_VTCa instead of the time information T_VTC. The flip-flop 152' may receive the divided time information T_VTCa instead of the time information T_VTC.

Figure 14:
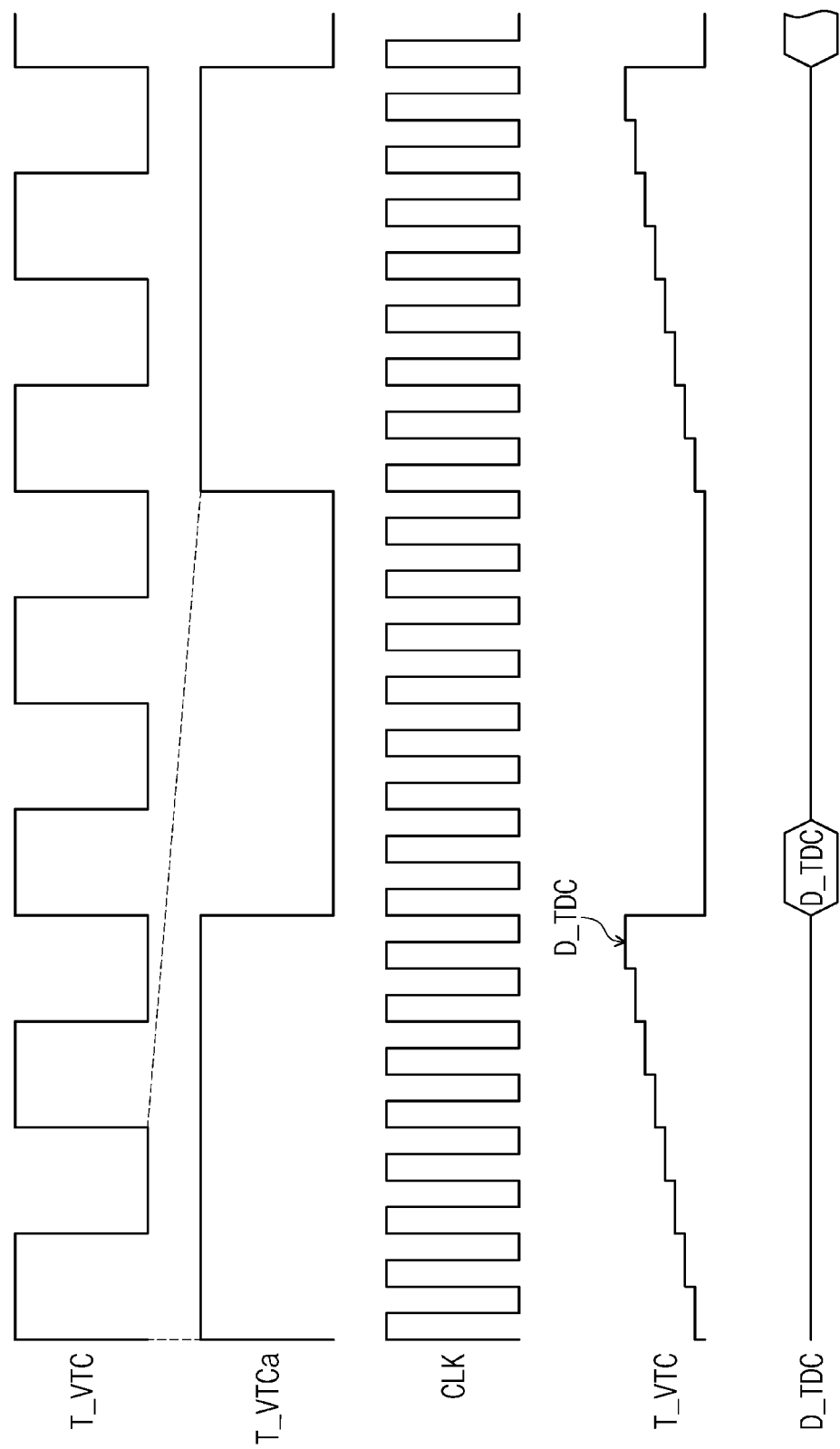
FIG. 14 illustrates an example in which a time-digital converter of FIG. 13 operates.

FIG. 14 illustrates an example in which the time-digital converter 150b of FIG. 13 operates. Referring to FIGS. 13 and 14, the clock signal CLK may swing between the high level and the low level (e.g., may periodically have a low-to-high transition and a high-to-low transition). While the divided time information T_VTCa is at the high level, the counter 151' may increase the count CNT in response to the clock signal CLK.

For example, if the divided time information T_VTCa is at the high level during eight cycles of the clock signal CLK, the counter 151 may increase the count CNT eight times. When the divided time information T_VTCa transitions to the low level, the flip-flop 152' may output the count CNT as the digital time information D_TDC and the counter 151' may initialize the count CNT.

Figure 15:
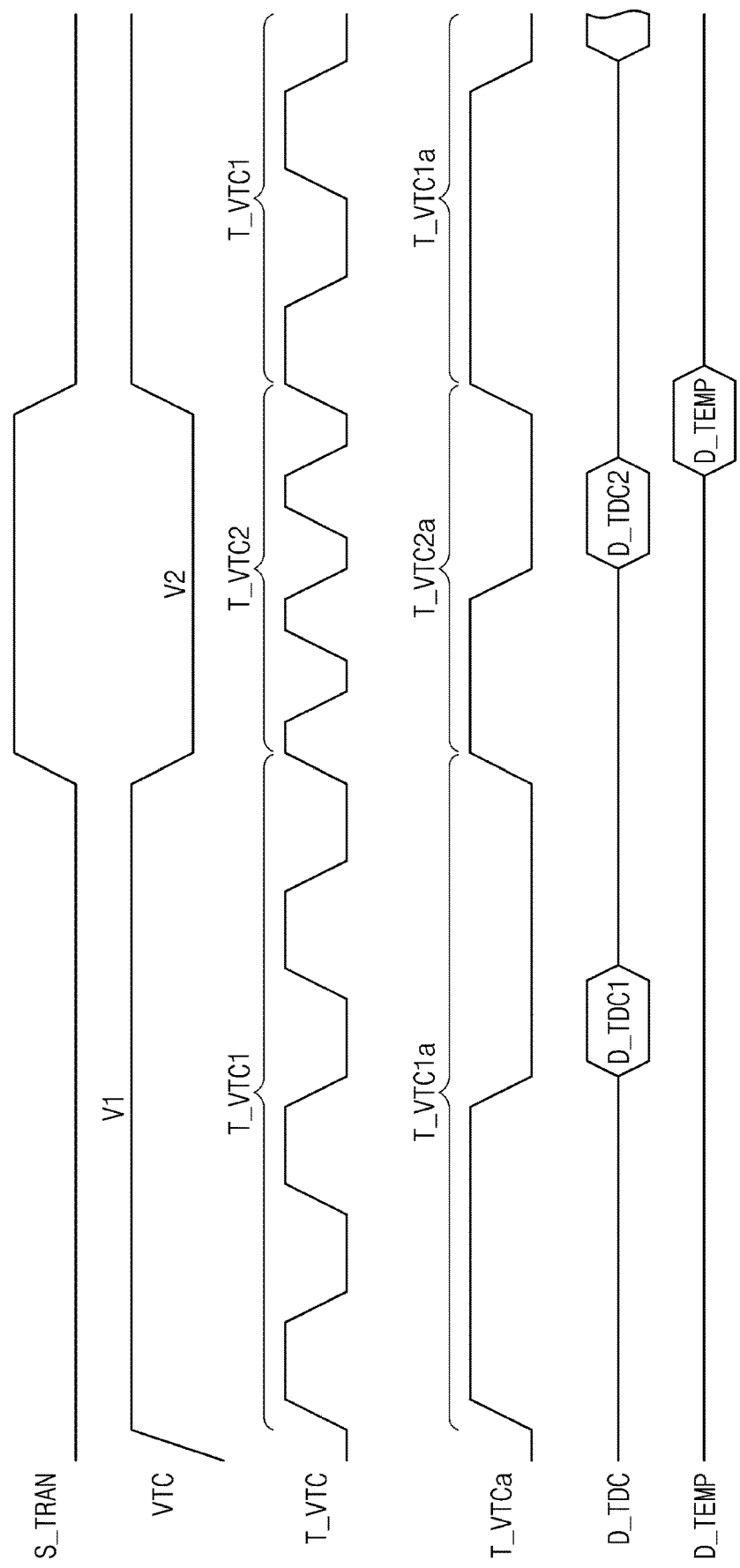
FIG. 15 illustrates an application example in which a temperature sensing device of FIG. 1 operates.

FIG. 15 illustrates an application example in which the temperature sensing device 100 of FIG. 1 operates. In an embodiment, an example of an operation of the temperature sensing device 100 including the time-digital converter 150b of FIG. 13 is illustrated in FIG. 15. Referring to FIGS. 1, 13, and 15, the digital processor 160 may alternately adjust the transition signal S_TRAN to the low level and the high level.

For example, the digital processor 160 may allow the transition signal S_TRAN to transition upon receiving the digital time information D_TDC from the time-digital converter 150b. For another example, the digital processor 160 may allow the transition signal S_TRAN to transition periodically.

When the transition signal S_TRAN is at the low level, the multiplexer 120 may output the first voltage V1 as the temperature coefficient voltage VTC. When the multiplexer 120 outputs the first voltage V1, the voltage-time converter 140 may output the first time information T_VTC1. The first time information T_VTC1 may have a period corresponding to a level of the first voltage V1.

The time-digital converter 150b may divide the first time information T_VTC1 to generate first divided time information T_VTC1a. The time-digital converter 150b may convert the first divided time information T_VTC1a to the first digital time information D_TDC1. The digital processor 160 may store the first digital time information D_TDC1.

When the transition signal S_TRAN is at the high level, the multiplexer 120 may output the second voltage V2 as the temperature coefficient voltage VTC. When the multiplexer 120 outputs the second voltage V2, the voltage-time converter 140 may output the second time information T_VTC2. The second time information T_VTC2 may have a period corresponding to a level of the second voltage V2.

The time-digital converter 150b may divide the second time information T_VTC2 to generate second divided time information T_VTC2a. The time-digital converter 150b may convert the second divided time information T_VTC2a to the second digital time information D_TDC2. The digital processor 160 may store the second digital time information D_TDC2. The digital processor 160 may calculate the digital temperature D_TEMP depending on Equation 1 and Equation 2.

Figure 16:
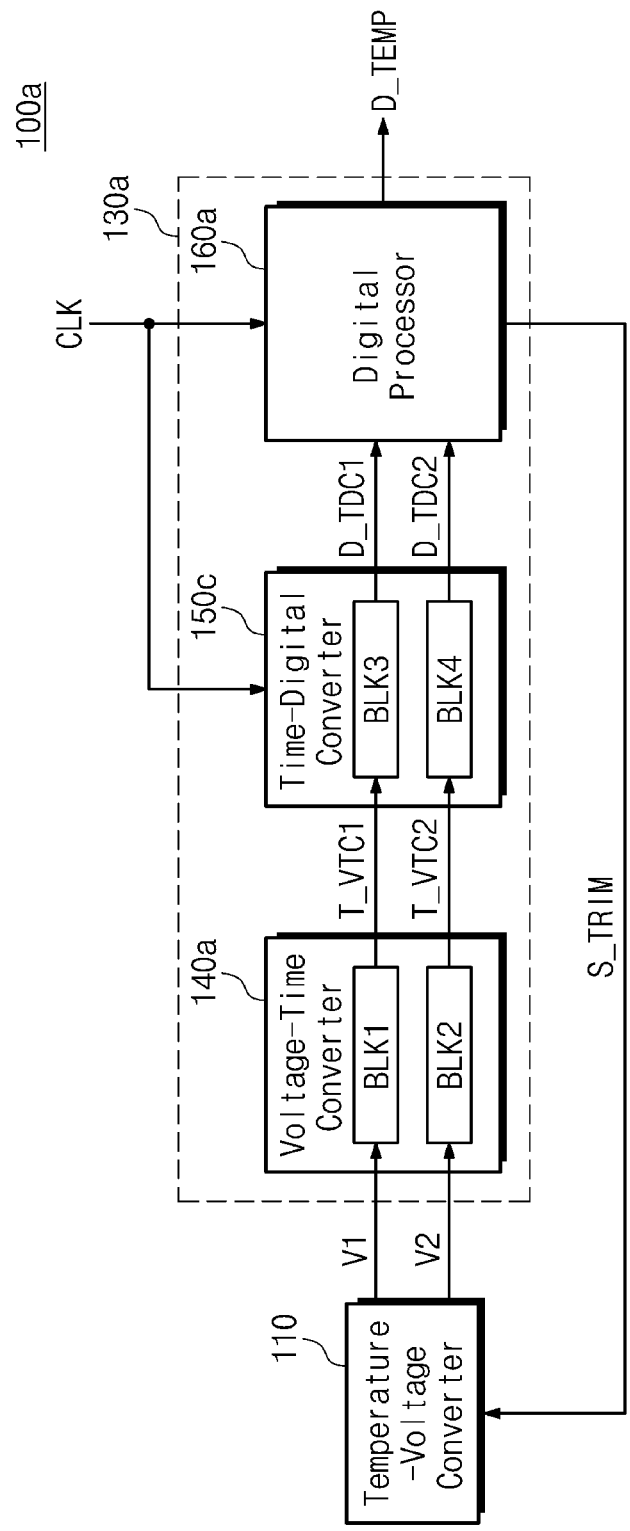
FIG. 16 is a block diagram illustrating a temperature sensing device according to an application example of the disclosure.

FIG. 16 is a block diagram illustrating a temperature sensing device 100a according to an application example of the disclosure. Referring to FIG. 16, a temperature sensing device 100a includes the temperature-voltage converter 110 and a temperature sensor 130a. As described with reference to FIG. 1, the temperature-voltage converter 110 may generate the first voltage V1 having the zero temperature coefficient ZTC and the second voltage V2 having the negative temperature coefficient NTC.

The temperature sensor 130a includes a voltage-time converter 140a, a time-digital converter 150c, and a digital processor 160a. The voltage-time converter 140a includes a first block BLK1 and a second block BLK2. The first block BLK1 may convert the first voltage V1 to the first time information T_VTC1. The second block BLK2 may convert the second voltage V2 to the second time information T_VTC2.

For example, each of the first block BLK1 and the second block BLK2 may have a structure described with reference to FIGS. 5 to 7 and may operate as described with reference to FIGS. 5 to 7. That is, the voltage-time converter 140a may respectively convert the first voltage V1 and the second voltage V2 to the first time information T_VTC1 and the second time information T_VTC2 at the same time or in parallel.

The time-digital converter 150c includes a third block BLK3 and a fourth block BLK4. The third block BLK3 may convert the first time information T_VTC1 to the first digital time information D_TDC1. The fourth block BLK4 may convert the second time information T_VTC2 to the second digital time information D_TDC2.

For example, each of the third block BLK3 and the fourth block BLK4 may have a structure described with reference to FIGS. 9 and 10 or a structure described with reference to FIGS. 13 and 14 and may operate as described with reference to FIGS. 9 and 10 or as described with reference to FIGS. 13 and 14. That is, the time-digital converter 150c may respectively convert the first time information T_VTC1 and the second time information T_VTC2 to the first digital time information D_TDC1 and the second digital time information D_TDC2 at the same time or in parallel.

The digital processor 160a may receive the first digital time information D_TDC1 and the second digital time information D_TDC2 at the same time or in parallel. As described with reference to Equation 1 and Equation 2, the digital processor 160a may calculate the digital temperature D_TEMP from the first digital time information D_TDC1 and the second digital time information D_TDC2.

As described above, the temperature-voltage converter 110 may generate the first voltage V1 and the second voltage V2 by using the power supply voltage VDD and the ground voltage VSS. A separate voltage that exceeds the power supply voltage VDD is not required to generate the first voltage V1 and the second voltage V2.

Also, the temperature sensor 130a may calculate the digital temperature D_TEMP from the first voltage V1 and the second voltage V2 by using the power supply voltage VDD and the ground voltage VSS. There is no need for a component, which requires a high voltage, such as an analog-digital converter for the temperature sensor 130a to calculate the digital temperature D_TEMP from the first voltage V1 and the second voltage V2.

According to the disclosure, the temperature sensing device 100a operating in an environment where the power supply voltage VDD is low (e.g., 1.2 V or lower) is implemented. Also, according to the disclosure, the temperature sensing device 100a that cancels out a process variable and an environment variable and calculates a more accurate digital temperature D_TEMP is provided.

In the above-described embodiments, components according to embodiments of the disclosure are referred to by using the term "block". The "block" may be implemented with various hardware devices, such as an integrated circuit, an application specific IC (ASCI), a field programmable gate array (FPGA), and a complex programmable logic device (CPLD), software, such as firmware and applications driven in hardware devices, or a combination of a hardware device and software. Also, "block" may include circuits or intellectual property (IP) implemented with semiconductor devices.

According to the disclosure, a temperature sensing device that senses a temperature by using a low power supply voltage is provided.

As is traditional in the field, embodiments may be described and illustrated in terms of blocks which carry out a described function or functions. These blocks, which may be referred to herein as units or modules or the like, are physically implemented by analog and /or digital circuits such as logic gates, integrated circuits, microprocessors, microcontrollers, memory circuits, passive electronic components, active electronic components, optical components, hardwired circuits and the like, and may optionally be driven by firmware and /or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:

1. A temperature sensing device comprising:
a temperature-voltage converter that outputs a first voltage, having a zero temperature coefficient that does not vary with a temperature, and a second voltage having a negative temperature coefficient varying in inverse proportion to the temperature;
a multiplexer that alternately outputs the first voltage and the second voltage depending on a transition signal; and
a temperature sensor that alternately receives the first voltage and the second voltage and to sense the temperature depending on a ratio of the first voltage and the second voltage.

2. The temperature sensing device of claim 1, wherein the temperature sensor converts the first voltage and the second voltage to first time information and second time information, respectively, and calculates the temperature depending on a ratio of the first time information and the second time information.

3. The temperature sensing device of claim 1, wherein the temperature sensor includes:

a voltage-time converter that converts the first voltage to first time information and to convert the second voltage to second time information;

a time-digital converter that converts the first time information to first digital time information and to convert the second time information to second digital time information; and a digital processor that calculates the temperature depending on a ratio of the first digital time information and the second digital time information.

4. The temperature sensing device of claim 3, wherein the first time information has a period associated with a level of the first voltage.

5. The temperature sensing device of claim 4, wherein the voltage-time converter includes:
   a latch that outputs the first time information and first inverted time information in response to a first output voltage and a second output voltage, when the multiplexer outputs the first voltage;
   a first voltage generator that increases a first comparison voltage in response to the first time information, when the multiplexer outputs the first voltage;
   a second voltage generator that increases a second comparison voltage in response to the first inverted time information, when the multiplexer outputs the first voltage;
   a first comparator that compares the first comparison voltage and the first voltage, in response to the first time information and the first inverted time information, and outputs the first output voltage as a result of the comparison, when the multiplexer outputs the first voltage; and
   a second comparator that compares the second comparison voltage and the first voltage, in response to the first time information and the first inverted time information, and outputs the second output voltage as a result of the comparison of the second comparator, when the multiplexer outputs the first voltage.

6. The temperature sensing device of claim 5, wherein the first voltage generator includes:
   a current source;
   a capacitor connected between the current source and a ground node; and
   a transistor connected between the current source and the ground node in parallel with the capacitor and configured to operate in response to the first time information, when the multiplexer outputs the first voltage.

7. The temperature sensing device of claim 5, wherein the first comparator includes:
   a comparison multiplexer that alternately outputs the first voltage and the first comparison voltage in response to the first inverted time information, when the multiplexer outputs the first voltage;
   an inverter that outputs the first output voltage, when the multiplexer outputs the first voltage;
   a capacitor connected between the comparison multiplexer and the inverter; and
   a switch connected in parallel with the inverter and configured to operate in response to the first time information.

8. The temperature sensing device of claim 5, wherein, when the multiplexer outputs the first voltage, a period of the first time information corresponds to twice a period for the first comparison voltage to increase and reach the first voltage.

9. The temperature sensing device of claim 3, wherein the time-digital converter includes:

a counter that receives a clock signal and to increase a count in response to the first time information when the multiplexer outputs the first voltage; and a flip-flop that outputs the count as the first digital time information in response to a transition of the first time information, when the multiplexer outputs the first voltage.

10. The temperature sensing device of claim 3, wherein the time-digital converter includes:
   a divider that divides a frequency of the first time information to output a first divided time information, when the multiplexer outputs the first voltage;
   a counter that receives a clock signal and to increase a count in response to the first divided time information when the multiplexer outputs the first voltage; and
   a flip-flop that outputs the count as the first digital time information in response to a transition of the first divided time information, when the multiplexer outputs the first voltage.

11. The temperature sensing device of claim 3, wherein the digital processor controls the transition signal such that the multiplexer outputs the second voltage, after outputting the first voltage, and calculates the temperature after sequentially receiving the first digital time information and the second digital time information.

12. The temperature sensing device of claim 1, wherein the temperature-voltage converter includes:
   a current source that outputs a first current and a second current, each of which has a first current amount;
   a reference voltage generator that outputs a reference voltage in response to the first current; and
   a first voltage generator that generates the first voltage in response to the second current and adjusts the first current amount such that the first voltage is identical to the reference voltage.

13. The temperature sensing device of claim 12, wherein:
   the reference voltage generator includes a resistor connected between the current source and a ground node, and
   a resistance value of the resistor is adjusted by a trim signal to allow the first voltage to have the zero temperature coefficient.

14. The temperature sensing device of claim 12, wherein the first voltage generator includes:
   a transistor having a first end connected to the current source, a second end connected to a ground node, and a gate connected to the first end; and
   an amplifier that compares the reference voltage and a voltage of the gate and to adjust the first current amount depending on a result of the comparison, wherein
   the voltage of the gate is output as the first voltage.

15. The temperature sensing device of claim 12, wherein:
   the current source further outputs a third current having a second current amount greater than the first current amount and a fourth current having the first current amount, and
   the temperature-voltage converter further includes:
      a voltage follower connected between the current source and a ground node and biased to drain a fifth current having the first current amount from the third current and to generate the first voltage; and
      a second voltage generator that generates the second voltage in response to a sixth current, which is obtained by subtracting the fifth current from the third current, the fourth current, and the first voltage of the voltage follower.

16. The temperature sensing device of claim 15, wherein the voltage follower includes a transistor having a first end connected to the current source, a second end connected to the ground node, and a gate connected to the first end.

17. The temperature sensing device of claim 15, wherein the second voltage generator includes:
- a first transistor and a fourth transistor connected between the current source and the ground node, wherein the fourth current flows through the first and fourth transistors; and
- a second transistor and a third transistor connected between the current source and the ground node, wherein the sixth current flows through the second and third transistors, wherein:
- the first transistor has a first end connected to the fourth transistor, a second end connected to the ground node, and a gate connected to the first end of the first transistor,
- the second transistor has a first end connected to the fourth transistor, a second end connected to the ground node, and a gate connected to the first end of the first transistor,
- the third transistor has a first end connected to the current source, a second end connected to the first end of the second transistor, and a gate connected to the second end of the third transistor,
- the fourth transistor has a first end connected to the current source, a second end connected to the first end of the first transistor, and a gate connected to the gate of the third transistor, and
- a voltage of the gate of the first transistor is output as the second voltage.

18. A temperature-voltage converter comprising:
- a resistor that receives a first current having a first current amount and generates a reference voltage by using the first current;
- a transistor that receives a second current having the first current amount and generates a first voltage by using the second current;
- an amplifier that compares the first voltage and the reference voltage and outputs a control voltage for adjusting the first current amount and a second current amount depending on a result of the comparison;
- a voltage follower transistor that receives a third current having the second current amount, drains a fifth current having the first current amount from the third current, and generates the first voltage by using the fifth current;
- a first voltage transistor and a fourth voltage transistor that receive a fourth current having the first current amount; and
- a second voltage transistor and a third voltage transistor that receive a sixth current obtained by subtracting the fifth current from the third current, wherein:
- the first voltage transistor mirrors the first current amount of the fourth current to the second voltage transistor,
- the third voltage transistor mirrors the first voltage of the voltage follower transistor to the fourth voltage transistor, and
- the first voltage is output as a zero temperature coefficient voltage and a voltage of a gate of the first voltage transistor is output as a negative temperature coefficient voltage.

19. The temperature-voltage converter of claim 18, wherein a size of the transistor and a size of the voltage follower transistor are identical to each other and sizes of the first and second voltage transistors are larger than the size of the transistor.

20. A temperature sensing device comprising:
- a temperature-voltage converter that outputs a first voltage, having a zero temperature coefficient that does not vary with a temperature, and a second voltage having a negative temperature coefficient varying in inverse proportion to the temperature;
- a voltage-time converter that converts the first voltage and the second voltage to first time information and second time information, respectively;
- a time-digital converter that converts the first time information and the second time information to first digital time information and second digital time information, respectively; and
- a digital processor that calculates the temperature depending on a ratio of the first digital time information and the second digital time information.

* * * * *